3,433,082
TRANSMISSION AND SELECTOR MECHANISM FOR ALTERNATE HAMMER AND HAMMER-DRILL POWER TOOL
Kenneth D. Bitter, Baltimore, George E. Atkinson, Linthicum Heights, and William B. Fogle, Baltimore, Md., assignors to The Black and Decker Manufacturing Company, Towson, Md., a corporation of Maryland
Filed Sept. 20, 1967, Ser. No. 669,020
U.S. Cl. 74—22
Int. Cl. F16h 25/12
25 Claims

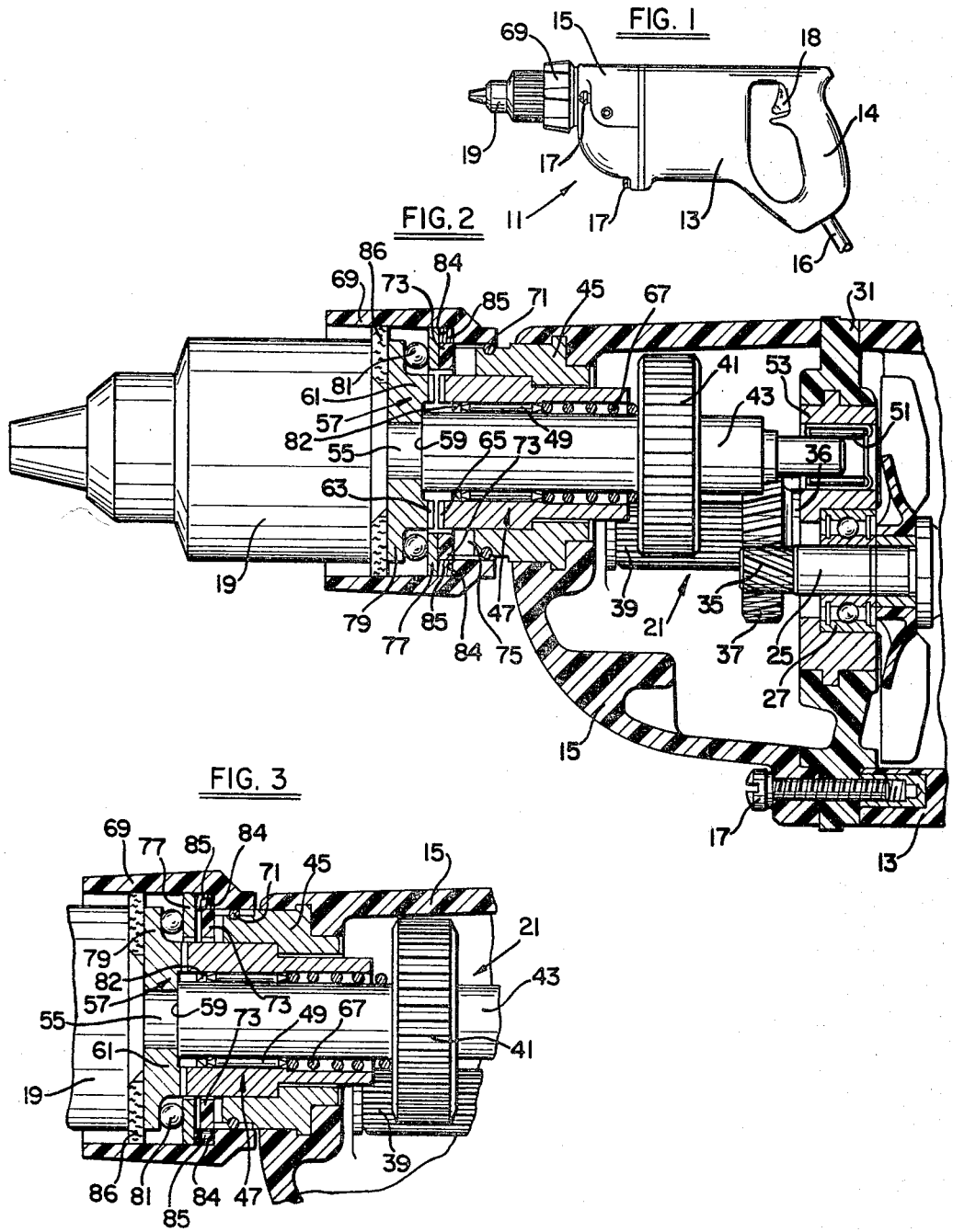

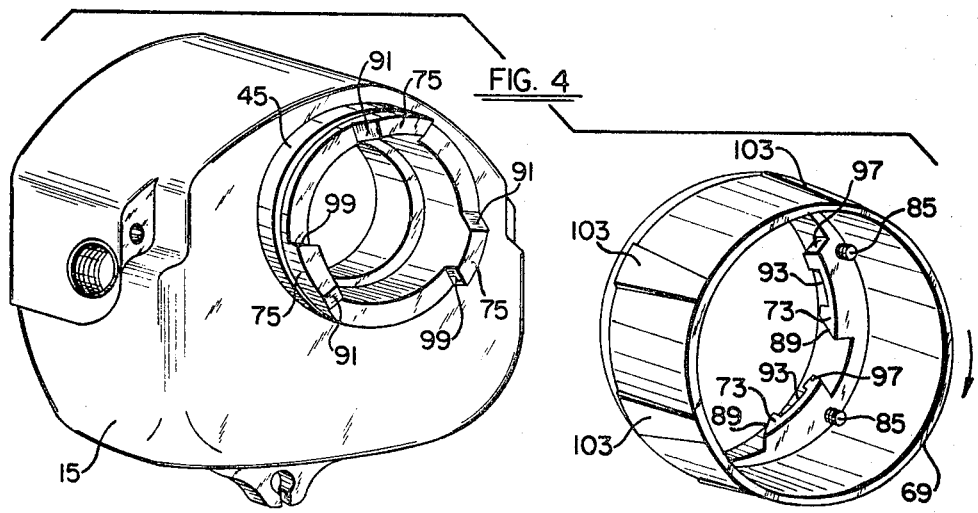
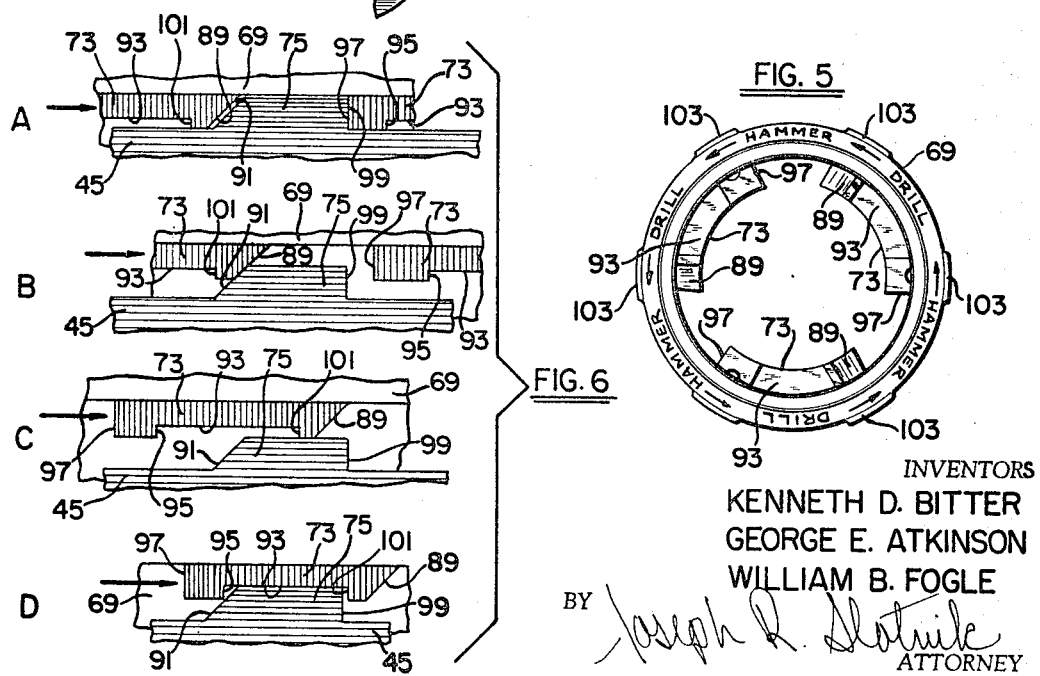
INVENTORS
KENNETH D. BITTER
GEORGE E. ATKINSON
WILLIAM B. FOGLE United States Patent Office 3,433,082
Patented Mar. 18, 1969

ABSTRACT OF THE DISCLOSURE

The device herein disclosed is a portable, hand-held tool comprising a housing with an electric motor supported therein and a tool chuck extending outwardly thereof. A transmission interconnects the motor and chuck and is constructed to selectively provide rotating movement alone or rotating together with reciprocating movement of the chuck and a tool bit carried thereby when the tool bit engages a work surface.

---

This invention relates generally to power drilling and impact-drilling tools, and particularly to an improved transmission and selector mechanism construction for converting these tools from drilling to impact-drilling and vice-versa.

SUMMARY OF THE INVENTION

The present invention relates to an improved transmission and selector mechanism construction for converting the movement of a power tool chuck from rotation only to rotation plus axial-reciprocation when a tool bit carried by the chuck engages a work surface. The transmission and selector mechanism includes a spindle shaft having a driven gear fixed thereto and which is supported within a housing for rotation and limited axial reciprocation. A pinion drivingly engages the spindle gear and the spindle shaft is adapted to have a tool chuck fixedly associated therewith along with a first cam which is adapted to cooperate with a second cam fixed within the housing to impart axial reciprocation to the spindle shaft during rotation thereof. Thrust bearing means for the spindle shaft is associated with at least one of the cams in a fashion calculated to reduce the number of parts and the overall tool length. Manually operable means is provided for positioning the cams in disengaged relation, or, alternatively, for permitting cooperative engagement therebetween whereby the spindle shaft and the chuck fixed thereto undergoes rotation alone or rotation plus axial reciprocation.

Main objects, therefore, of the present invention are to provide an improved transmission and selector mechanism for converting the movement of a power tool spindle shaft and chuck from simple rotation to rotation plus axial reciprocation when a tool bit carried by the chuck engages a work surface, which mechanism employs a minimum of parts and provides a relatively compact and light weight construction, is easily accessible and the component parts thereof readily removable for repair and/or replacement, minimizes required precision and therefore manufacturing costs, and requires minimal maintenance because of fewer wearing parts.

Further important objects of the present invention are to provide an improved transmission and selector mechanism of the above character which provides sturdy and accurate support for the mechanism components and which minimizes the steps and effort required to effect said conversion.

Additional important objects of the present invention are to provide an improved transmission and selector mechanism of the above character which is positive and accurate in operation and which lends itself readily to use with a variety of tools including the "all insulated" type.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a power-driven tool embodying the present invention;

FIG. 2 is an enlarged, vertical sectional view of a portion of FIG. 1, illustrating a preferred form of the present invention and showing the parts in the rotation only or "drilling" position;

FIG. 3 is a fragmentary view similar to FIG. 2, and showing the parts in position for rotation plus axial reciprocation or "impact-drilling";

FIG. 4 is an exploded perspective view illustrating the selector mechanism components of the present invention;

FIG. 5 is an end view of the manually movable selector component of FIG. 4;

FIG. 6 is a view illustrating the sequential relative positions occupied by the components of FIG. 4 when changing from "impact-drilling" to "drilling"; and FIG. 7 is a side view of the impacting cams.

Broadly described, the present invention includes a power-driven tool comprising a housing, shaft means supported by said housing for rotary and limited axial movement and adapted to have a tool carrying member fixed relative thereto for movement therewith, means for rotating said shaft means, first cam means within said housing, second cam means fixed relative to said shaft means, said first and second cam means being relatively rotatable and including cooperable cam surfaces for imparting axial movement to said shaft means, thrust bearing means associated with said second cam means and radially disposed relative to said cam surfaces, and manually operable means supported relative to said housing and operatively engageable with at least one of said cam means, said manually operable means being movable from a first position where said cam surfaces can cooperatively engage to a second position where said cam surfaces are spaced and cannot engage, whereby to facilitate rotation plus axial reciprocation, and rotation only, respectively, of said shaft means.

In another aspect, the present invention includes a power driven tool comprising a housing, motor driven, rotating shaft means within said housing and having an outer end adapted for operative connection to a tool, engageable first and second cam members fixed relative to said housing and shaft means, respectively, and adapted, when engaged, to impart axial reciprocating movement to said shaft means during rotation thereof, manually operable means operatively engageable with at least one of said cam members and adapted to prevent engagement of said cam members whereby to facilitate rotation only of said shaft means, and thrust bearing means associated with said manually operable means and said second cam member and radially disposed relative to said first cam member.

In still another aspect, the present invention includes a power driven tool comprising a housing, motor means within said housing, shaft means rotated by said motor means and supported for rotation and axial reciprocation, cam means fixed relative to said shaft and engageable with means on said housing to reciprocate said shaft during rotation thereof, manually operable means for preventing engagement of said cam means and said means on said housing, and thrust bearing means operably interconnecting said manually operable means and said cam means and being disposed radially of the engaging portions of said cam means and said means on said housing.

In yet another aspect, the present invention includes a powder driven tool comprising a housing, shaft means supported within said housing for rotation and limited axial reciprocation, a chuck fixed to said shaft means, motor means within said housing, transmission means interconnecting said motor means and said shaft means including first and second intermeshing gears one of which is fixed to said shaft means and is movable axially therewith, the other of said gears being fixed against axial movement and driven by said motor, cooperable cam means fixed to said housing and shaft means, respectively, manually operable means associated with said cam means for selectively, relatively locating said cam means in a first position where they are prevented from engaging and in a second position where they can cooperatively engage, said cam means when in said second position imparting axial reciprocation to said shaft means during rotation thereof, and thrust bearing means associated with said shaft mounted cam means and disposed radially relative to the cooperating portions of said cam means.

DETAILED DESCRIPTION

Referring now more particularly to the drawings, a hammer drill embodying the present invention is illustrated generally at 11 in FIG. 1 and comprises a housing including a motor housing 13 provided with a switch handle 14, and a gear case 15 secured thereto by screws 17. An electric motor (not shown) within the housing 13 is adapted to be energized from a suitable power source connected thereto by a line cord 16 and is controlled by a switch 18 mounted on the handle 14. Alternately, a pneumatic motor could be employed and the switch 18 used to actuate a control valve therefor. A chuck 19, driven by the motor (not shown) through a transmission 21 (FIG. 2), extends forwardly of the gear case 15 and is adapted to receive a tool bit (not shown). The motor housing 13 and gear case 15 can be constructed of cast aluminum or magnesium. Alternatively, they can be constructed using an insulating, non-metallic material selected from the group consisting of polyamides, polycarbonates, polyphenylene, oxides, phenylenes, acetals, rigid vinyls and glass fiber reinforced polyester or thermoplastics if the tool 11 is to be of the "all insulated" type.

The electric motor (not shown) within the motor housing 13 has a motor shaft 25 supported fore and aft by ball bearings 27 (only one of which is shown in FIG. 2). The shaft 25 forms the input to the transmission 21 and extends forwardly through a gear case cover 31 which carries the forward bearing 27, and into the gear case 15 and is formed at its forward or outer end with pinion teeth 35, or has a pinion suitably fixed thereto (not shown). The pinion teeth 35 (or pinion as the case may be) drivingly engage an idler gear 37 which is pressed on or formed integral with a shaft 36 rotatably supported upon the gear case cover 31 and the front wall of the gear case 15. An intermediate pinion 39 is formed on a hub of or is keyed to the idler gear 37 so as to rotate therewith, and drivingly engages a spindle gear 41 which is pressed on, keyed to, or otherwise secured to a spindle shaft 43 forming the output of the transmission 21. (See also FIG. 3.) The gear case 15, if formed from one of the nonmetallic materials listed above, has a stepped bore, metal insert 45 molded in place therein. Alternatively, the gear case 15 can have an integral construction equivalent to the insert 45, particularly if the gear case is formed of metal. A stationary annular cam 47 is pressed within or otherwise secured to the insert 45 and has a needle bearing 49 pressed therewithin. The needle bearing 49 receives and supports an intermediate portion of the spindle shaft 43 forwardly of the spindle gear 41. The rearward end of the spindle shaft 43 is supported by a needle bearing 51 pressed in an insert 53 which is molded in place in the gear case cover 31. Alternatively, the insert 53 may be omitted and made an integral part of the cover 31 particularly where the cover is formed from metal.

The bearings 49, 51 rotatably support the spindle shaft 43, as described above, and in addition permit the shaft 43 to selectively undergo limited axial movement during use of the tool 11. The tool chuck 19 is threadedly secured on a reduced forward end 55 of the spindle shaft 43 and traps a rotary cam 57 against a shoulder 59 on the spindle shaft 43. The cam 57 has a rearwardly extending annular portion 61 formed with circumferentially-spaced serrated teeth 63 which are adapted to cooperatively engage circumferentially spaced, serrated teeth 65 formed on the front face of the stationary cam 47.

Thus, when the cam teeth 63, 65 are cooperatively engaged, as shown in FIG. 3, and the spindle shaft 43 rotated, the cam teeth 63 ratchet over the cam teeth 65 thereby causing the spindle shaft 43 and the chuck 19 fixed thereto to reciprocate axially. However, when the rotary cam 57 is positioned away from the stationary cam 47 and the cam teeth 63, 65 are out of engagement, as shown in FIG. 2, the spindle shaft 43 and the chuck 19 undergo pure rotation.

According to one important aspect of the invention, means is provided whereby the rotary cam 57 is selectively permitted and prevented from moving toward the stationary cam 47 thereby facilitating rotation plus axial reciprocation, and pure rotation of the spindle shaft 43 and chuck 19, respectively. This means, a collar 69, is rotatably and axially slidably supported on the forward end of the insert 45 and snugly engages an O-ring 71 carried by the latter. The collar 69 may be constructed of any suitable material but preferably is of an insulating, non-metallic material selected from the group set out above for the motor housing 13 and gear case 15. The collar 69, as perhaps best seen in FIG. 4, has a plurality of arcuately shaped, angularly spaced, cam sectors 73 formed internally thereof and integrally therewith and which are adapted to cooperate with arcuately shaped, angularly spaced cam sectors 75 formed integrally with the insert 45. A thrust washer 77 is located between the cam sectors 73 and a radially outwardly extending flange 79 on the rotary cam 57, and the washer 77 and flange 79 cage a plurality of thrust balls 81 therebetween (see FIGS. 2 and 3). The balls 81 are held in angularly spaced relationship by a ball retainer (not shown) and the balls 81 together with the washer 77 and flange 79 serve as a thrust bearing for the spindle shaft 43. A plurality of compression springs 85 are seated in pockets 84 formed in the cam sectors 73 and bias the thrust washer 77 toward the balls 81 and the latter against the flange 79. A felt washer 86 is trapped between the chuck 19 and the cam 57 and engages the collar 69 and together with the O-ring 71 prevents dirt from gaining access to the internal parts. An annular member 82 is positioned between the shaft 43 and the stationary cam 47 forwardly of the spring 67 and seals the transmission 21.

The collar 69 is adapted to be turned in a clockwise direction, as viewed in FIG. 4, and in a counterclockwise direction, as viewed from the rear of the tool 11 in FIG. 5, to alternately axially align and disalign the cam sectors 73, 75 on the collar 69 and insert 45, respectively. FIG. 2 illustrates the position of the parts when the sectors 73, 75 are disaligned, and an external force is acting on the shaft 43 as when a tool bit carried by the chuck 19 is pressed against a mesh surface. FIG. 6 illustrates this sequence of movement. Thus, when the sectors 73, 75 are axially aligned, as shown in sequence D of FIG. 6, the collar 69 is positioned axially toward the left, as seen in FIG. 2, and the teeth 63, 65 on the rotating cam 57 and stationary cam 47, respectively, are spaced from each other and are prevented from engaging so that the spindle shaft 43 and chuck 19 will rotate only. During this time, thrust on the shaft 43 is absorbed by the thrust bearing. However, when the cam sectors 73, 75 are disaligned, as shown in sequence A of FIG. 6, the collar 67 is positioned axially toward the right under the force of the springs 85. However, these springs 85, acting through the thrust washer 77, the balls 81 and the rotary cam 57 continue to hold the cams 47, 59 separated. When the tool bit (not shown) carried by the chuck 19 is pressed against a work surface, this reacts against the shaft 43 compressing the springs 25 and moves the cam 57 toward the cam 47. When this occurs, the parts will be in position as shown in FIG. 3, so that the teeth 63, 65 engage and the spindle shaft 43 and chuck 19 reciprocate axially. This delayed engagement between the teeth 63, 65 permits the operator to position the tool bit against a work surface before impacting begins which has proven to be very desirable. A compression spring 67 is caged between the bearing 49 and the gear 41 and biases the shaft 43 toward the right, as seen in FIGS. 2 and 3. The spring 67 is somewhat weaker than the combined effect of springs 85 so as not to overcome the latter. However, spring 67 takes up end play in the shaft 43 and prevents it from undergoing excessive axial movement and in addition, maintains the gear 41 and cam 47 spaced. This prevents excessive noise, wear and friction between the parts.

As shown in FIGS. 4 and 6, the cam sectors 73 on the collar 69 have their leading edges, when viewed in the clockwise direction of turning as seen in FIG. 4, and from left to right in the sequential illustration of FIG. 6, tapered or inclined as shown at 89. The trailing edges of the sectors 75, when viewed in the same direction, are complementary tapered as shown at 91 so that when the collar 69 is turned in the clockwise direction, or from left to right, as described above, the edges 89 of the sectors 73 will slide easily over the edges 91 of the sectors 75 as shown in sequence B of FIG. 6, to cam the collar 69 axially toward the left to the position shown in FIG. 2.

The collar cam sectors 73 are recessed or notched at 93 to receive the insert cam sectors 75 when the sectors 73, 75 are aligned to hold the collar 69 in this rotative position and prevent inadvertent or accidental unintended collar turning. (See sequence D of FIG. 6.) However, when it is desired to move the cam sectors 73, 75 out of alignment, the collar 69 is again turned in the clockwise direction whereupon trailing edges 95 at the notches 93 on the cam sectors 73 engage and slide up on the tapered trailing edges 91 on the sectors 75. Continued turning movement of the collar 69 will eventually bring the cam sectors 73 to positions intermediate or out of alignment with the cam sectors 75. Thereafter, when the tool bit (not shown) is pressed against a work surface, the shaft 43 is moved toward the right, as seen in FIG. 3, as is the collar 69 whereupon the cam sectors 73, 75 are positioned as shown in sequence A of FIG. 6. As shown, the trailing edges of the collar cam sectors 73 are straight axial surfaces as shown at 97, as are the leading edges 99 of the insert cam sectors 75 and the leading edges 101 of the notches 93. These straight edges prevent the collar 69 from being turned in a counterclockwise direction.

In use then, the operation of the tool 11 is changed from pure rotation (drilling) to rotation plus axial reciprocation (hammer drilling) by turning the collar 69 clockwise approximately 60°. Thus, the angular distance from sequence D to sequence A of FIG. 6 is approximately 60°. When the collar 69 is turned another 60° (back to sequence D) the tool operation is changed back to drilling so that the cycle is complete with only 120° turning movement of the collar 69. To advise the operator which position the collar 69 is in and what operation the tool will perform, the collar 69 may have the words "hammer" and "drill" printed, etched or molded thereon at 60° intervals, as shown in FIG. 5, so that which of the two indicia is at the top of the collar 69 will represent the tool operation selected. Furthermore, the collar 69 may have raised portions or grips 103 formed integrally thereon to facilitate easy turning movement thereof.

It will be appreciated that by disposing the thrust bearing components, including the flange 79, the balls 81 and the washer 77, radially relative to the cams 47, 57, as opposed to these parts being in general axial alignment, the overall length of the tool 11 is significantly reduced. In addition, the cam 57 of the present invention embodies one component of the thrust bearing (flange 79) so that the number of individual parts required in this tool is also reduced. Also, axial movement of the shaft 43 is accounted for through the relatively movable gears 41, 39, which obviates the need for additional movable joint such as, for example, a splined connection.

Another desirable feature of this construction is that the parts can be easily serviced. Thus, by simply unscrewing the chuck 19, the cams 47, 57 and the thrust bearing are all accessible for removal and/or replacement. Furthermore, the motor housing 13 and gear case 15, as well as the collar 69 can be constructed using one of the non-metallic, insulating materials listed heretofor thereby providing an "all insulated" tool 11.

By the foregoing, there has been disclosed an improved selector mechanism construction for converting the operation of a rotary power tool from rotation only to rotation plus axial reciprocation calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:
1. A power-driven tool comprising a housing, shaft means supported by said housing for rotary and limited axial movement and adapted to have a tool carrying member fixed relative thereto for movement therewith, means for rotating said shaft means, first cam means within said housing, second cam means fixed relative to said shaft means, said first and second cam means being relatively rotatable and including cooperable cam surfaces for imparting axial movement to said shaft means, thrust bearing means associated with said second cam means and radially disposed relative to said cam surfaces, and manually operable means supported relative to said housing and operatively engageable with at least one of said cam means, said manually operable means being movable from a first position where said cam surfaces can cooperatively engage, to a second position where said cam surfaces are spaced and cannot engage, whereby to facilitate rotation plus axial reciprocation, and rotation only, respectively, of said shaft means.

2. A construction as defined in claim 1 wherein said first cam means is fixedly disposed within said housing and said manually operable means is operatively engageable with said second cam means.

3. A construction as defined in claim 2 which includes means normally biasing said second cam means and its surface away from cooperative engagement with the surface of said first cam means, when said manually operable means is in said first position, said second cam means being movable in a direction against the action of said biasing means upon application of an exterior force axially upon said shaft means.

4. A construction as defined in claim 1 wherein said thrust bearing means includes a flange on said second cam means and extending generally radially outwardly relative thereto.

5. A construction as defined in claim 2 wherein said manually operable means includes a collar supported upon said housing and encompassing said second cam means.

6. A construction as defined in claim 1 wherein said manually operable means includes a collar supported upon said housing and operatively engaged with said second cam means, said collar being adapted selectively to permit and prevent movement of said second cam means toward said first cam means.

7. A construction as defined in claim 6 wherein said thrust bearing means forms the operative engagement between said collar and said second cam means.

8. A construction as defined in claim 6 which includes first resilient means normally biasing said second cam means and its surface in one direction away from cooperative engagement with said surfaces of said first cam means, and second resilient means weaker than and opposing said first resilient means, said second cam means being movable in another direction opposite said first direction when said collar is in said first position and force is applied axially to said shaft means.

9. A construction as defined in claim 8 wherein said collar is rotatably and axially slidable relative to said housing, said collar and housing having cooperating cam surfaces, whereby said collar moves axially relative to said housing from said first position to said second position upon rotation of said collar.

10. A construction as defined in claim 9 wherein said thrust bearing means forms the operative engagement between said collar and said second cam means, said first resilient means being between said collar and thrust bearing means and being effective to bias said collar in a direction causing engagement of said cam surfaces on said collar and housing.

11. A power driven tool comprising a housing, motor driven, rotating shaft means within said housing and having an outer end adapted for operative connection to a tool, engageable first and second cam members fixed relative to said housing and shaft means, respectively, and adapted, when engaged, to impart axial reciprocating movement to said shaft means during rotation thereof, manually operable means operatively engageable with at least one of said cam members and adapted to prevent engagement of said cam members whereby to facilitate rotation only of said shaft means, and thrust bearing means associated with said manually operable means and said second cam member and radially disposed relative to said first cam member.

12. A construction as defined in claim 11 wherein said first cam member encompasses and supports said shaft means for rotation and axial reciprocation.

13. A construction as defined in claim 12 which includes bearing means associated with said first cam member and supporting said shaft means.

14. A construction as defined in claim 12 which includes first spring means operatively engaging said thrust bearing means and biasing said second cam member away from said first cam member, and second spring means weaker than said first spring means and operatively engaging said shaft means and said first cam member to oppose said first spring means thereby preventing looseness, noise and excessive wear of the parts.

15. A construction as defined in claim 14 wherein said manually operable means includes a collar rotatably supported relative to said housing, said collar and housing having cooperating cam surfaces which impart axial movement to said collar upon rotation thereof, the axial movement of said collar being effective through said thrust bearing means to selectively permit and prevent movement of said second cam member toward said first cam member.

16. A construction as defined in claim 11 wherein said housing is constructed using a non-metallic, insulating material and has a metallic insert at one end forming a part thereof, said first cam member being fixed within said insert.

17. A construction as defined in claim 15 wherein said collar is constructed using a non-metallic insulating material.

18. A construction as defined in claim 11 wherein said manually operable means includes a collar rotatably supported upon and movable axially relative to said housing, said collar and housing having cooperating, segmented cam surfaces which, when said colar is rotated, cause said collar to move axially on said housing from a first position where said second cam member is permitted to move toward said first cam member to a second position where said second cam member is prevented from moving toward said first cam member, said segmented cam surfaces on said collar and housing being repetitive whereby turning movement of said collar through less than 180° effects a full cycle of axial movement thereof.

19. A construction as defined in claim 18 which includes first spring means normally biasing said collar in a direction causing engagement between said cooperating cam surfaces and said second cam member in a direction away from said first cam member, and second spring means weaker than and opposing said first spring means.

20. A construction as defined in claim 19 wherein said first spring means comprises a plurality of compression springs carried by said collar and engaging said thrust bearing means.

21. A construction as defined in claim 20 wherein said second spring means includes a compression spring operatively caged between said first cam member and said shaft means.

22. A power driven tool comprising a housing motor means within said housing, shaft means rotated by said motor means and supported for rotation and axial reciprocation, said shaft means being adapted to have a tool operatively connected thereto for movement therewith, cam means fixed relative to said shaft and engageable with means on said housing to reciprocate said shaft during rotation thereof, manually operable means for preventing engagement of said cam means and said means on said housing, and thrust bearing means operably interconnecting said manually operable means and said cam means and being disposed radially of the engaging portions of said cam means and said means on said housing.

23. A power driven tool comprising a housing, shaft means supported within said housing for rotation and limited axial reciprocation, a chuck fixed to said shaft means, motor means within said housing, transmission means interconnecting said motor means and said shaft means including first and second intermeshing gears, one of which is fixed to said shaft means and is movable axially therewith, the other of said gears being fixed against axial movement and driven by said motor, cooperable cam means fixed to said housing and shaft means, respectively, manually operable means associated with said cam means for selectively relatively locating said cam means in a first position where they are prevented from engaging and in a second position where they can cooperatively engage, said cam means when in said second position imparting axial reciprocation to said shaft means during rotation thereof, and thrust bearing means associated with said shaft mounted cam means and disposed radially relative to the cooperating portions of said cam means.

24. A tool as defined in claim 23 which includes first resilient means normally maintaining said cam means in spaced, non-cooperating relation, said first resilient means being overriden when a tool bit fixed to said chuck is pressed into engagement with a work surface.

25. A tool as defined in claim 24 which includes second resilient means, having less strength than said first resilient means, opposing said first resilient means, said first and second resilient means acting on said shaft means and cooperating to prevent excessive axial movement thereof thereby reducing noise and preventing excessive wear.

References Cited

UNITED STATES PATENTS

| | | | |
|---|---|---|---|
| 2,275,898 | 1/1957 | Baier | 77—7 |
| 2,794,621 | 6/1957 | Beeson | 173—109 |
| 2,968,960 | 1/1961 | Fulop | 74—22 |
| 2,970,483 | 2/1961 | Schrum | 74—22 |
| 2,979,962 | 4/1961 | Nindel | 74—22 |
| 3,018,674 | 1/1964 | Kohler | 74—22 |
| 3,121,813 | 2/1964 | Pratt et al. | 77—7 |

FRED C. MATTERN, JR., *Primary Examiner.*

W. S. RATLIFF, JR., *Assistant Examiner.*

U.S. Cl. X.R.

77—7; 173—109; 310—156

UNITED STATES PATENT OFFICE
CERTIFICATE OF CORRECTION

Patent No. 3,433,082          March 18, 1969

Kenneth D. Bitter et al.

It is certified that error appears in the above identified patent and that said Letters Patent are hereby corrected as shown below:

Column 3, line 9, "powder" should read -- power --; line 49, "polyester" should read -- polyesters --. Column 4, line 69, after "are" insert -- aligned and FIG. 3 illustrates these parts when the sectors 73, 75 are --.

Signed and sealed this 21st day of April 1970.

(SEAL)
Attest:

Edward M. Fletcher, Jr.

Attesting Officer

WILLIAM E. SCHUYLER, JR.

Commissioner of Patents